United States Patent Office 3,340,757
Patented Sept. 12, 1967

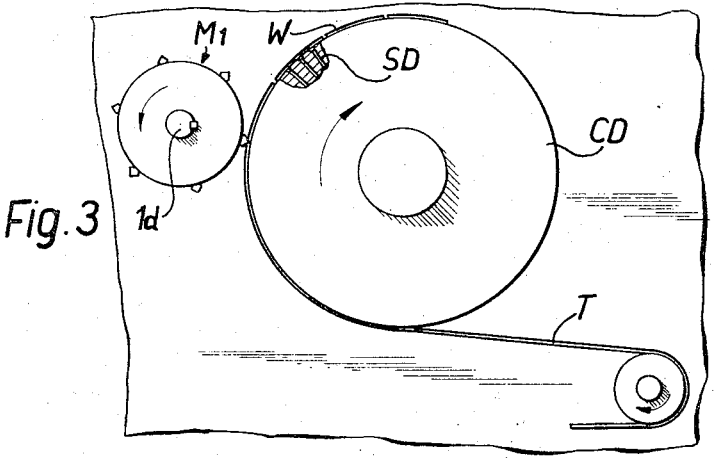
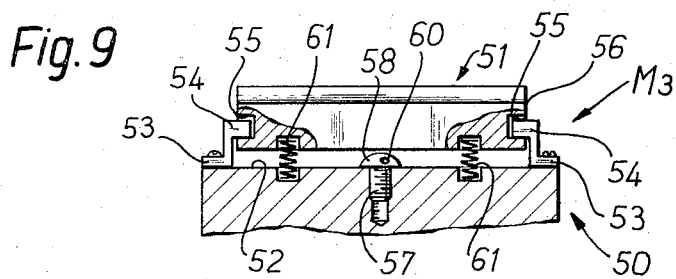
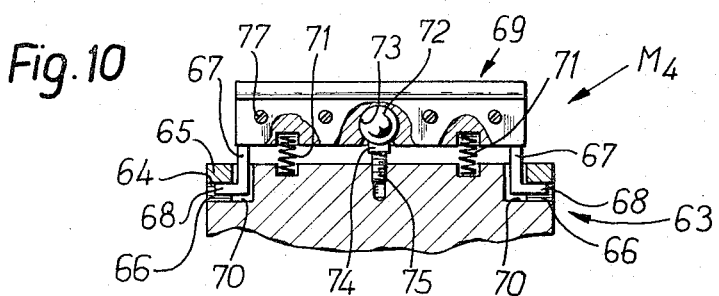
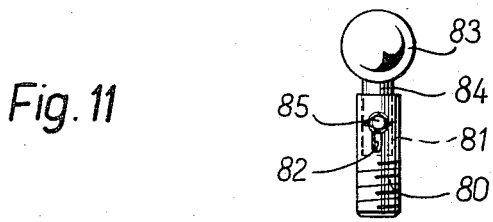

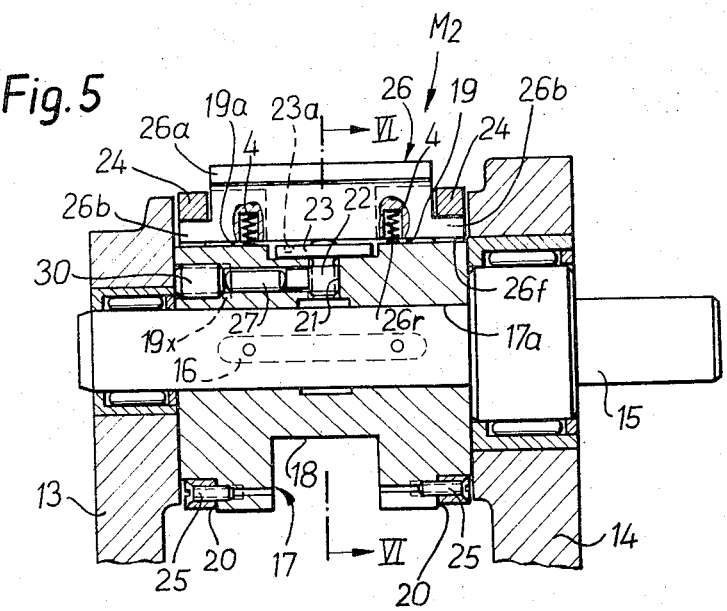
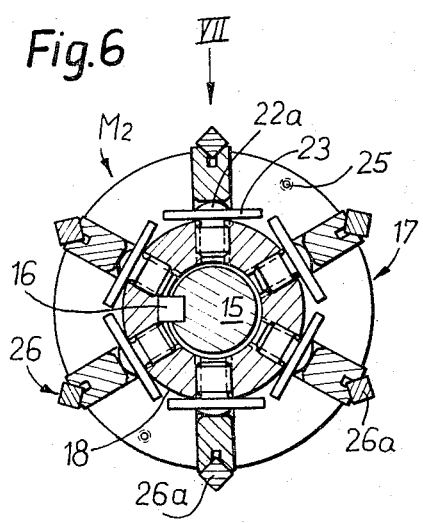
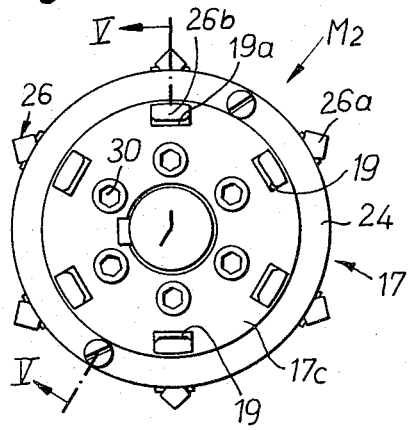
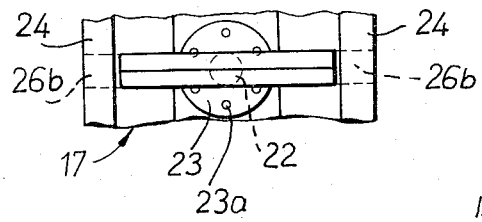

3,340,757
CUTTER FOR ADHESIVE-COATED TAPE AND THE LIKE
Willy Rudszinat, Hamburg-Lohbrugge, Germany, assignor to Hauni Werke Korber & Co. K.G., Hamburg, Germany
Continuation of application Ser. No. 305,390, Aug. 29, 1963. This application Apr. 20, 1966, Ser. No. 544,036
Claims priority, application Germany, Aug. 21, 1957, H 30,945
25 Claims. (Cl. 83—348)

This is a continuation of my application Ser. No. 305,390, filed on Aug. 29, 1963, and now abandoned, which in turn is a continuation-in-part of my application Ser. No. 753,582, filed on Aug. 6, 1958, and now abandoned.

The present invention relates to improvements in rotary cutting apparatus, and more particularly to a rotary cutter with one or more blade-like cutting members which is especially suited for use in filter cigarette machines wherein wrappers of requisite length are severed from an adhesive-coated tape to be applied around filter mouthpieces and around the adjacent end portions of cigarette rods. My improved rotary cutter is equally useful in filter mouthpiece machines wherein two or more plugs of filter mouthpiece material are assembled end-to-end and are thereupon joined to form composite filter mouthpieces which are connected with cigarette rods in a subsequent step. The cutter of my invention may be put to use in many other types of machines, for example, in labelling machines wherein a length of running tape is severed into individual labels, in the manufacture of paper bags, and for many other purposes.

It is an important object of my invention to provide a rotary cutter whose blade-like cutting member or members will form an extremely accurate cut in very thin layers of paper or similar sheet material and whose cutting members may be readily adjusted with little loss in time so that the cutter may be used for severing of thicker or thinner layers of sheet material.

Another object of the invention is to provide a rotary cutter with one or more self-aligning cutting members each of which will assume an optimum position in a fully automatic way whenever the countersurface (against which the edges of the cutting members strike after passing through the material of a thin sheet) is out of alignment with the cutter.

A further object of the invention is to provide a cutter wherein at least some adjustments in the position of its cutting members may be carried out while the cutter remains in operative position so that such adjustments may be completed with little loss in time.

An additional object of the invention is to provide a rotary cutter wherein each cutting member may be readily exchanged with little loss in time and wherein the position of each cutting member may be adjusted with utmost accuracy.

A further object of the invention is to provide a cutter wherein the adjustment of cutting members in response to progressing wear upon their cutting edges takes place in a fully automatic way so that the cutting members must be adjusted by hand only at the time the cutter is assembled and eventually at the time a new cutting member or a new cutting edge must replace a damaged or worn-away cutting member or cutting edge.

A concomitant object of the invention is to provide an apparatus which may be utilized for accurate adjustment of cutting members in a cutter of the above outlined characteristics.

Still another object of the invention is to provide a rotary cutter whose cutting members are mounted in such a way that their cutting edges are subjected to stresses of equal magnitude and that such stresses are distributed uniformly along the full length of each cutting edge.

With the above objects in view, one feature of my invention resides in the provision of a cutter comprising a rotary carrier member which may assume the form of a drum, a cutting member having an elongated cutting edge which is coplanar with the axis and which extends beyond the peripheral surface of the carrier member, fulcrum means provided on one of these members and arranged to provide a pivot for the cutting member intermediate the ends of the cutting edge so that the cutting edge may be tilted to a small degree into and out of parallelism with but remains in the plane of the axis of the carrier member, and retaining means for limiting such tilting of the cutting member.

In accordance with another feature of my invention, the cutting member is free to perform limited radial movements with reference to the carrier member and the cutter preferably comprises adjusting means for regulating the distance between the pivot and the axis of the carrier member so as to compensate for wear upon the cutting member or to adjust the cutter for use in a different setup.

The novel features which are considered as characteristic of the invention are set forth in particular in the appended claims. The improved cutter itself, however, both as to its construction and the method of assembling and using the same, together with additional features and advantages thereof, will be best understood from the following detailed description of certain specific embodiments with reference to the accompanying drawings, in which:

FIG. 3 is a schematic view of a portion of a cigarette or filter cigarette machine wherein the cutter of FIGS. 1 and 2 cooperates with a cutting drum to sever wrappers from a length of adhesive-coated wrapping tape;

FIG. 4 is an end view of a modified rotary cutter;

FIG. 5 is a section as seen in the direction of arrows from the line V—V of FIG. 4;

FIG. 6 is a section as seen in the direction of arrows from the line VI—VI of FIG. 5;

FIG. 7 is a fragmentary elevational view of the modified cutter as seen in the direction of the arrow VII in FIG. 6;

FIG. 9 is a fragmentary axial section through the carrier of a third rotary cutter wherein the cutting members are coupled to the carrier by pairs of retaining brackets which extend into suitable recesses provided in the end faces of the cutting members;

FIG. 10 is a similar fragmentary axial section through a fourth rotary cutter wherein the fulcrum also serves to couple the cutting member to the carrier; and FIG. 11 is an elevational view of a modified fulcrum which may be used in the rotary cutter of FIG. 10.

Figure 1:
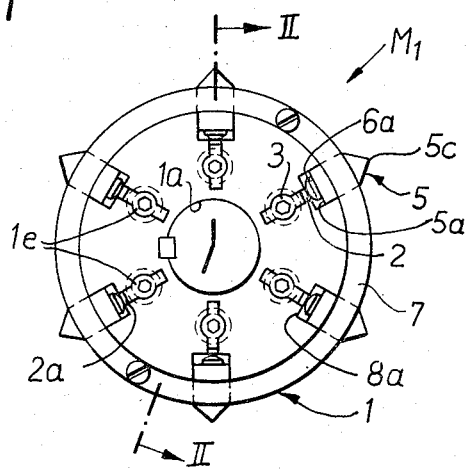
FIG. 1 is an end view of a rotary cutter which embodies one form of my invention and which comprises six blade-like cutting members.
Figure 2:
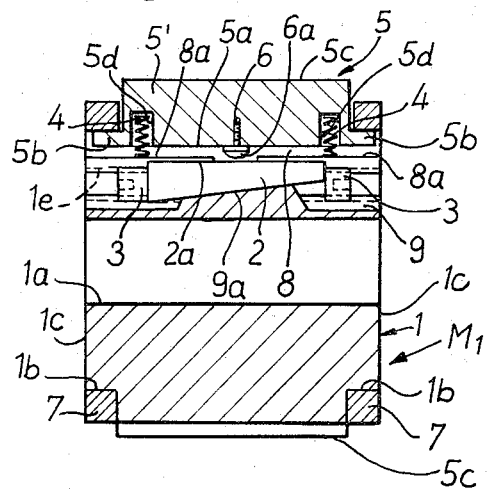
FIG. 2 is a section through the cutter as seen in the direction of arrows from the line II—II of FIG. 1.

Referring to FIGS. 1 and 2, there is shown a rotary cutter $M_1$ which comprises a rotary carrier member 1 here shown as a cylindrical drum having an axial bore 1a adapted to receive a drive shaft 1d (see FIG. 3) serving as a means to rotate the cutter at a predetermined speed. This drum 1 is formed with a series of equidistant elongated grooves 8 which are parallel with the axis of the bore 1a and which extend radially inwardly from the peripheral surface of the drum. The inner portion of each groove 8 forms a narrow slot 9 which extends radially inwardly and which is bounded at its inner end by a bottom face 9a. The faces 9a are inclined with reference to the axis of the drum and constitute flat cam faces whose purpose will be explained hereinafter. Each groove 8 forms with the respective slot 9 a composite cutout which serves to accommodate an elongated cutting member or blade 5 whose cutting portion 5c extends beyond the peripheral surface of the drum and whose cutting edge is coplanar with the axis of the bore 1a. The blades 5 are free to slide radially in the respective grooves 8 and each thereof comprises a pair of outwardly extending end portions in the form of axial projections or lugs 5b which are adjacent to the end faces 1c of the drum 1. As shown in FIG. 2, the drum is formed with a pair of circumferential recesses 1b which are adjacent to the end faces 1c and each of which receives a retaining element in the form of a ring 7. These rings may be press-fitted onto the drum so as to remain in the position of FIG. 2 and to retain the blades 5 in the respective grooves 8 as well as to prevent excessive tilting of the cutting edges.

The inner end faces 5a of the blades are formed with pairs of radially outwardly extending blind bores 5d each of which is adjacent to a projection 5b and each of which receives a portion of a helical spring 4. The innermost convolutions of these springs bear against shoulders 8a between the grooves 8 and the respective slots 9 so that the springs 4 bias the projections 5b against the internal surfaces of the retaining rings 7 and normally maintain the edges of the cutting portions 5c in parallelism with the axis of the drum. The outer sides of the projections 5b are preferably of convex shape so as to be in full face-to-face abutment with the internal surfaces of the rings 7.

In order to insure that the cutting portions 5c may properly engage the periphery of a cylindrical body whose axis might not be truly parallel with the axis of the drum 1, the cutter $M_1$ further comprises a fulcrum for each blade 5 so that the cutting portions 5c may be tilted in planes passing through the axis of the drum 1. Each fulcrum comprises a stem 6 which is screwed into or which is otherwise secured to the respective blade and which extends outwardly from the respective inner end face 5a thereof, and a spherical head 6a which is located intermediate the ends of the respective cutting portion (i.e., intermediate the respective projections 5b and intermediate the respective springs 4) and which is adjacent to the inner end face 5a so that it may come into abutment with the outer end face 2a of a wedge-shaped adjusting member 2 which is received in the respective slot 9 and which abuts against the respective cam face 9a. The end faces 2a are parallel with the axis of the drum 5. FIG. 2 shows that there remains a narrow gap between the apex of the head 6a and the outer end face 2a of the respective adjusting member when the projections 5b abut against the rings 7 so that the blade 5 is free to perform limited radial movements with respect to the drum 1 in addition to tilting movements about the head 6a. Such tilting movements will take place in response to radially inwardly directed pressure upon the cutting portion 5c at the one or the other side of the fulcrum 6, 6a. In other words, each blade actually floats in its groove and may move radially of the drum 1 (in response to or against the bias of the respective springs 4) and each blade may also pivot about the apex of the respective head 6a once it moves radially inwardly so that the head 6a abuts against the outer end face 2a of the respective adjusting member. The distance between the rings 7 exceeds slightly the length of that portion 5′ of each blade which is received in the respective groove 8 so that the blades may be tilted within limits, i.e., to the extent determined by the rings 7 which control such tilting movements in two ways, namely, by being in the path of the projections 5b and by being in the path of the main body portions 5′. Actual cutting action will take place when the head 6a abuts against the respective adjusting member 2 at which time the cutting portion 5c is free to tilt because at least one of the projections 5b is spaced from the respective ring 7.

Since it is normally desirable to provide for radial adjustments of the cutting portions 5c toward and away from the axis of the drum 1, the cutter $M_1$ comprises means for shifting the adjusting members 2 in their respective slots 9, and such shifting means assumes the form of pairwise arranged locking screws 3 which are received in tapped bores 1e provided in the end faces 1c of the drum 1. The arrangement is such that the locking screws 3 normally engage the longitudinal end faces of the respective adjusting member 2 and that the locking screws are loosened at the time an operator desires to change the radial position of a given blade. Of course, the radial position of a blade 5 remains unchanged (even if the respective adjusting member 2 changes its position) as long as the respective cutting portion 5c is not subjected to the action of forces which would tend to move it radially inwardly. However, a blade will change its radial position when the adjusting member 2 is shifted to a new position and when the blade thereupon moves radially inwardly against the bias of the cooperating springs 4.

While the cutter $M_1$ comprises six blades 5, the operation of the cutter remains unchanged if the number of blades is reduced or increased and even if the drum 1 supports a single blade. The number of blades will depend on the r.p.m. of the cutter, on the desired distance between consecutive cuts through a wrapping tape or similar sheet material and/or on the speed at which the tape is being moved in the path.

When an operator desires to shift one or more adjusting members 2 to a new position with reference to the associated fulcra, the drum 1 may remain on its shaft 1d because the screws 3 are accessible from the end faces 1c of the drum.

The cutter of FIGS. 1 and 2 operates as follows:

It is assumed that this cutter is used to sever wrappers W of predetermined length from a continuous length of adhesive-coated tape T which passes along the periphery of a so-called cutting drum CD in a filter cigarette machine, see FIG. 3. That portion of the cutting drum CD which is adjacent to the tape T is finished to a high degree of smoothness and serves as an anvil or countersurface for the edges of the cutting portions 5c. When the edge of a cutting portion 5c strikes against the tape T it causes the respective blade 5 to move its head 6a into abutment with the adjusting member 2 so that the blade is arrested and the edge of the cutting portion 5c forms a clean cut to sever a wrapper W from the tape. If the axis of the cutting drum CD is not entirely parallel with the axis of the drum 1, the blade is caused to pivot about the apex of the head 6a so as to move the edge of the cutting portion 5c into exact parallelism with the axis of the cutting drum. As shown in FIG. 3, the tape T is caused to slip with respect to the periphery of the cutting drum CD so that the wrappers W are automatically spaced from each other. The drum CD is formed with suction ducts SD which cause the tape T and the wrappers W to adhere thereto in a manner well known in the art of tobacco processing and cigarette making machines.

FIGS. 4 to 7 illustrate a modified rotary cutter $M_2$ which is supported by a pair of spaced frame members 13, 14 forming part of the frame in a cigarette machine. This cutter includes a rotary carrier member here shown as a drum 17 having a centrally located circumferential recess 18 and an axial bore 17a which receives a shaft 15. A key 16 serves to insure that the drum 17 is compelled to participate in rotary movements of the shaft 15.

The drum 17 is further provided with axially parallel grooves 19 each of which receives an elongated cutting member or blade 26, and each of these blades comprises a detachable cutting portion 26a of polygonal cross section which is fixed to the main body portion of the respective blade in a manner well known in the art and forming no part of this invention. It will be noted that the cutting edges of the cutting portions 26a are coplanar with the axis of the drum 17 and that they extend beyond the peripheral surface of this drum.

The blades 26 comprise outwardly extending axial projections or lugs 26b which are adjacent to the internal surfaces of two retaining rings 24 mounted on the drum 17 by means of axially parallel fastening screws 25. The drum is formed with a pair of circumferential recesses 20 each of which accommodates a ring 24 and each of which extends inwardly from one end face 17c of the drum, i.e., the rings 24 are recessed in the peripheral surface of the drum so that they cannot interfere with the cutting portions 26a when the cutter $M_2$ is in actual use.

The lugs 26b are biased against the rings 24 by pairs of helical springs 4 which are received in blind bores 26r provided in the inner end faces 26f of the respective blades. Thus, the springs 4 normally maintain the blades at a slight distance from the bottom faces 19a of the grooves 19.

The drum 17 is provided with six tapped bores 21 each of which extends radially inwardly from the central portion of the bottom face 19a in a groove 19. These bores 21 receive threaded stems 22 of suitable fulcra whose collars 23 are adjacent to the inner end faces 26f of the respective blades 26 at points located centrally between the respective lugs 26b. The collars 23 assume the form of washers which are rigidly mounted on or are integral with the outer end portions or heads 22a of the respective stems 22. These heads 22a extend outwardly and beyond the outer sides of the disks 23 and are upset to resemble spherical rivet heads which may come into actual abutment with the respective blades 26. Each washer 23 is formed with a series of circularly arranged apertures or recesses 23a which may receive the prongs of a suitable tool serving as a means for changing the angular position of the respective stems 22 so as to move the heads 22a nearer to or further away from the axis of the drum 17 and to thereby regulate the radial play of the blades 26. Of course the apertures 23a constitute but one form of engaging means which may be used to facilitate angular and resultant axial adjustments of the fulcra 22, 22a, 23.

The drum 17 is further provided with six axially extending tapped bores 19x which receive slidable locking pins 27 and locking screws 30. The pins 27 serve as a means for locking the respective stems 22 against unintentional axial displacements when the cutter $M_2$ is in actual use, and the screws 30 serve to bias the pins 27 against the respective stems. It will be noted that the inner end of each axial bore 19x communicates with one of the radial bores 21. The screws 30 are driven home by means of a suitable tool as soon as the respective washers 23 are properly adjusted to move the heads 23a into requisite position and to thus adjust the radial play of the blades 26.

In operation, the cutter $M_2$ cooperates with a cutting drum CD of the type shown in FIG. 3 to sever from a continuous length of adhesive-coated tape T a series of wrappers W which are used to connect a filter mouthpiece with the end portions of two cigarette rods. The shaft 15 is driven in synchronism with the drum CD so that the cutting portions 26a sever wrappers of requisite length.

Figure 8:
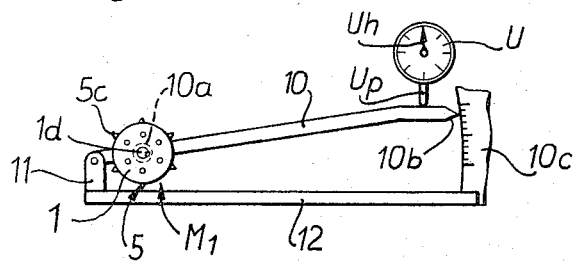
FIG. 8 is a schematic side elevational view of an apparatus which serves to adjust the radial position of pivots for the cutting blades in the cutter of my invention.

FIG. 8 illustrates an apparatus which serves to facilitate accurate adjustments of the cutting blades so that their cutting edges will be located on the periphery of an imaginary circle which is truly concentric with the drum 1 or 17. This apparatus comprises a base plate 12 which may be placed onto a bench or the like and which is provided with an upwardly extending bracket 11 pivotally supporting one end portion of a gauge lever 10. The lever 10 carries intermediate its ends a bearing 10a which may receive the shaft 1d of the cutter $M_1$ so that the drum 1 of this cutter may rotate about a horizontal axis. The right-hand end portion of the lever 10 may engage the spring-biased plunger Up of a micrometer dial gauge U which will indicate any inaccuracies in the adjustment of consecutive blades 5 when the drum 1 rotates about the axis of the shaft 1d. The right-hand end 10b of the lever 10 assumes the form of a pointer to cooperate with a fixed scale 10c which is graduated to indicate the minimum radial distance between the axis of the drum 1 and the cutting edges of the blades 5 when the drum rotates in the bearing 10a.

In utilizing the apparatus of FIG. 8, the operator mounts the shaft 1d in the bearing 10a and moves a selected blade 5 into abutment with the base plate 12. The spring-biased plunger Up presses the selected blade radially inwardly of the drum 1 by compressing the springs 4, and such compressive action upon the springs 4 is assisted by the weight of the lever 10 which tends to pivot in a clockwise direction, as viewed in FIG. 8. The operator then rotates the corresponding pair of screws 3 until the pointer 10b moves into registry with a selected graduation on the fixed scale 10c, and the hand Uh of the gauge U will assume its zero position when the respective blade is adjusted with requisite accuracy.

The operator then proceeds to adjust the other blades 5 in the same way to insure that the edges of the cutting portions 5a will properly engage the periphery of the cutting drum CD when the cutter $M_1$ is in actual use. The bearing 10a is preferably located close to the bracket 11 to make sure that the pointer 10b will sweep a long section of the scale 10c in response to very small radial adjustments of the blades 5.

The apparatus of FIG. 8 is equally useful for adjustment of the blades 26 in the cutter $M_2$ of FIGS. 4 to 7 since the bearing 10a may receive the shaft 15 or the bearing 10a may be replaced by another bearing which will take the shaft 15.

It goes without saying that all parts of the improved cutter are machined with utmost precision and consist of wear-resistant material which may be hardened or otherwise treated to insure long-lasting use and the formation of accurate cuts across the tape T. The cutter of my invention is used in mass-producing cigarette machines or filter cigarette machines and is intended to rotate at speeds of up to and more than 800 r.p.m. so that it may form close to 5,000 cuts per minute. Under such circumstances, the formation of clean cuts across the tape T is of utmost importance because the failure to furnish satisfactory wrappers W would result in production losses running into thousands of cigarettes even if the faulty operation is detected and corrected without delay. If the blades 5 or 26 fail to form a clean cut so that the wrappers adhere to each other after they pass the cutting station, the wrapping mechanism of the machine will be unable to join the cigarette rods with the filter mouthpieces and the wrappers will become entangled in the machine with resultant soiling of parts (one side of each wrapper is coated with adhesive), production losses and eventual breakdown of the machine. Furthermore, and since a filter cigarette machine is often mounted in series with a cigarette rod machine, with a filter machine and with a packaging machine, any failure of the cutter to sever the tape at regular intervals will entail substantial losses in packaging material and will cause a number of other inconveniences.

If desired, the springs 4 may be dispensed with since the blades 5 or 26 will tend to move away from the axis of the respective drum in a fully automatic way (in response to centrifugal force) as soon as the cutter is set in rotary motion. Also, the fulcra 6, 6a of the type shown in FIGS. 1 and 2 may be replaced by fulcra 22, 22a, 23 or vice versa, and the wedges 2 may be replaced by radially adjustable abutments for the fulcra 6, 6a without affecting the operation and adjustments of the blades.

Referring to FIG. 9, the carrier drum 50 of the rotary cutter M₃ need not be provided with axially extending grooves because the blade-like cutting member 51 is fully exposed, i.e. it is mounted in its entirety radially outwardly of the peripheral surface 52 of the drum 50. This drum supports two spaced retaining elements here shown as brackets 53 which are detachably secured thereto by screws or the like and which comprise projections or noses 54 received in radially extending recesses or slots 55 provided in the end faces 56 of the cutting member 51. The length of the recesses 55 (as seen in the radial direction of the drum 50) exceeds the height of the projections 54 so that the cutting member 51 may move radially of and may be tilted with respect to the drum 50 while its edge remains in a plane which passes through the axis of the drum.

The fulcrum assumes the form of a screw 57 having a rounded head 58 which may come into abutment with the inner end face of the cutting member 57 which is located midway between the recesses 55. The screw 57 may be rotated by a tool whose prong enters into a hole 60 drilled into the head 58 so that the brackets 53 need not be separated from the drum when an operator desires to adjust the axial position of the screw in order to regulate the radial play of the cutting member 51. Springs 61 serve to bias the member 51 radially outwardly so that the inner end face of the member 51 need not be in actual contact with the head 58 when this member does not engage the cutting drum. Of course, the brackets 53 may be replaced by suitable retaining rings, such as the rings which will be described in connection with FIG. 10, provided that the cutting member 51 comprises prongs which cooperate with the rings to limit radial movements of the cutting edge.

The configuration of the projections 54 and of the recesses 55 is such that the cutting edge of the member 51 is compelled to remain in a plane which passes through the axis of the drum 50.

FIG. 10 illustrates a rotary cutter M₄ wherein the end portions of a drum 63 are formed with peripheral recesses 64 which receive retaining elements in the form of rings 65. These recesses are provided with radially inwardly extending channels 66 each of which receives an outwardly extending terminal portion 68 of an L-shaped prong 67 which is rigid with an elongated blade-like cutting member 69. The channels 66 communicate with radial bores 70 through which the prongs 67 extend. Springs 71 bias the cutting member 69 radially outwardly so that the terminal portions 68 normally abut against the internal surfaces of the respective retaining rings 65.

The fulcrum of FIG. 10 comprises a spherical head 72 which is received in a complementary socket 73 of the cutting member 69 and which comprises a radially extending tubular section 74 telescopically receiving the outer section of a screw 75 which is threaded into a radially extending tapped bore provided in the drum 63 and located centrally between the retaining rings 65. Thus, the tubular section 74 may move radially of the drum 69 but prevents the edge of the cutting member 69 from leaving a plane which passes through the axis of the drum. The screw 75 may be provided with a slot which is normally concealed by the tubular section 74 and which is exposed upon removal of the cutting member 69 so that the screw may be adjusted to assume a new axial position with respect to the drum. Such axial adjustment of the screw 75 will determine the extent of radial play of the cutting member 69.

FIG. 11 illustrates a modified fulcrum wherein the screw 75 is replaced by a screw 80 having a section provided with an axially extending blind bore 81 and at least one radially extending axially parallel slot 82. The bore 81 receives a cylindrical section 84 which is integral with a spherical head 83 and which is receiprocable in the bore 81 to the extent limited by a radial pin 85 whose outwardly extending head may serve as a means for rotating the screw 80 with respect to the drum, not shown. The pin 85 extends through the slot 82. The fulcrum of FIG. 11 may be used in the rotary cutter of FIG. 10 and, with some modifications, in the cutter M₁ or M₂.

In order to assemble the fulcrum with the cutting member 69, i.e., to insert the head 72 or 83 into the socket 73, the cutting member 69 comprises two halves which are joined by screws or rivets 77.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of this invention and, therefore, such adaptations should and are intended to be comprehended within the meaning and range of equivalence of the following claims.

What is claimed as new and desired to be secured by Letters Patent is:

1. A cutter comprising a rotary carrier member having a peripheral surface; a cutting member having an elongated cutting edge which is coplanar with the axis and is located externally of the peripheral surface of said carrier member; fulcrum means supported by one of said members and arranged to provide a pivot for said cutting member so that the cutting edge may be tilted into and out of parallelism with the axis of said carrier member and the pivot transmits cutting pressure during penetration of said cutting edge into the material to be cut; retaining means for limiting such tilting of the cutting member; and adjusting means for changing the distance of said fulcrum means either relative to the cutting edge of said cutting member or relative to the axis of said carrier member.

2. A cutter as set forth in claim 1, wherein said cutting member is normally free to perform limited radial movements with reference to said carrier member and wherein said pivot transmits cutting pressure from said carrier member to said cutting member.

3. A cutter as set forth in claim 1, wherein the peripheral surface of said carrier member is provided with a plurality of axially parallel radially extending grooves and wherein a separate cutting member extends into each of said grooves and separate fulcrum means are arranged in the respective grooves for each of said cutting members to provide pivots for such cutting members while the respective cutting edges remain in planes including said axis, said pivots being arranged to transmit cutting pressure from the carrier member to the respective cutting members.

4. A cutter as set forth in claim 3, wherein said retaining means comprises a pair of rings secured to said carrier member at the opposite sides of said fulcrum means, and projections provided on said cutting members inwardly adjacent to said rings to prevent withdrawal of said cutting members from the respective grooves.

5. A cutter as set forth in claim 1, wherein the peripheral surface of said carrier member is provided with an axially parallel radially inwardly extending groove having a bottom face and wherein the cutting edge of said cutting member is straight, said cutting member extending into said groove and having an inner end face which is normally spaced from said bottom face, said cutting member also comprising two end portions located in said groove, said retaining means comprising a pair of retaining elements fixed to said carrier member and each located radially outwardly of one end portion of said cutting member, said fulcrum means being secured to said one member and having a rounded portion adjacent to the face of the other member intermediate said end portions so that the cutting member is tiltable about said rounded portion to the extent determined by said retaining elements and the rounded portion transmits cutting pressure from the carrier member to the cutting member.

6. A cutter as set forth in claim 1, wherein said pivot transmits cutting pressure from said carrier member to said cutting member and further comprising resilient means for biasing said cutting member against said retaining means.

7. A structure as set forth in claim 1, wherein said cutting member is an elongated member having a straight cutting edge and is adjacent to the peripheral surface of said carrier member, said cutting member having two end faces each provided with a recess extending radially of said carrier member and said retaining means comprising a pair of retaining elements fixed to said carrier member and each having a portion extending into one of said recesses so that the cutting member is movable radially and is tiltable in a plane passing through said cutting edge and through the axis of said carrier member, said fulcrum means having a rounded portion located between said members intermediate said recesses and being secured to said one member so that said rounded portion transmits cutting pressure from said carrier member to said cutting member.

8. A cutter as set forth in claim 1, wherein said retaining means comprises a pair of retaining elements secured to axially spaced portions of said carrier member and each defining with said carrier member a channel adjacent to said peripheral surface, said cutting member being adjacent to said peripheral surface and comprising two spaced portions each of which is received with clearance in one of said channels so that the cutting member is movable radially of said carrier member, said fulcrum means being located between said channels and being arranged to transmit cutting pressure from said carrier member to said cutting member.

9. A cutter as set forth in claim 8, wherein said fulcrum means comprises a spherical head received in a socket provided in one of said members and having a section extending radially of said carrier member, and a threaded element screwed into the other member and having a section coaxial with and movable in the axial direction of said first mentioned section.

10. A cutter as set forth in claim 1, particularly for severing a length of running tape into wrappers of the type utilized to join filter mouthpieces and cigarette rods in cigarette processing machines, wherein said carrier member resembles a drum and said peripheral surface is provided with an axially and radially extending groove, said cutting member resembling a blade movable radially in said groove, said retaining means being arranged to limit radial movements of the cutting member in said groove and said fulcrum means being located between the ends of said cutting member and secured to said one member to transmit cutting pressure from the carrier member to the cutting member.

11. A cutter comprising a rotary carrier member having a peripheral surface; a cutting member having an elongated cutting edge which is located externally of said peripheral surface and in a plane including the axis of said carrier member; adjustable fulcrum means supported by one of said members and arranged to provide pivot means for said cutting member so that said cutting edge may be tilted in said plane; means for limiting such tilting of the cutting member; and adjusting means for changing the distance of said fulcrum means either relative to the cutting edge of said cutting member or relative to the axis of said carrier member.

12. A cutter comprising a countersurface; a rotary carrier member having an external surface; a cutting member having an elongated cutting edge located externally of said surface and arranged to cut against said countersurface; fulcrum means supported by one of said members and arranged to provide a pivot for said cutting member so that the cutting edge may be tilted with reference to the axis of said carrier member; and adjusting means for changing the distance of said fulcrum means either relative to said countersurface or relative to the axis of said carrier member.

13. A cutter as set forth in claim 12, further comprising means for limiting the tilting of said cutting member.

14. A cutter as set forth in claim 13, wherein said limiting means comprises a plurality of annular elements.

15. A cutter as set forth in claim 12, wherein said fulcrum means is arranged to transmit cutting pressure from said carrier member to said cutting member.

16. A cutter comprising a rotary carrier member having a peripheral surface; a cutting member having an elongated cutting edge coplanar with the axis of said carrier member and located externally of said peripheral surface; adjustable fulcrum means supported by one of said members and arranged to provide a pivot for said cutting member intermediate the ends of said cutting edge so that the cutting edge may be tilted into and out of parallelism with the axis of said carrier member; retaining means for limiting such tilting of the cutting member; and adjusting means for regulating the distance between said fulcrum means and the axis of said carrier member.

17. A cutter comprising a rotary carrier member having a peripheral surface; a cutting member having an elongated cutting edge which is coplanar with the axis of said carrier member and is located externally of said peripheral surface; fulcrum means supported by one of said members and arranged to provide a pivot for said cutting member intermediate the ends of said cutting edge so that the cutting edge may be tilted into and out of parallelism with the axis of said carrier member, said fulcrum means being adjustable radially of said carrier member; locking means for arresting said fulcrum means in selected positions of adjustment; and retaining means for limiting such tilting of the cutting member.

18. A cutter comprising a rotary carrier drum having a peripheral surface provided with elongated radially inwardly extending axially parallel grooves each having a bottom face; elongated cutting blades extending into said grooves and having straight cutting edges located externally of said peripheral surface, each blade having two end portions and an inner end face spaced from the respective bottom face so that the blades are movable radially of said drum; retaining means normally spaced from the end portions of said blades and mounted on said drum to provide a clearance between said retaining means and the respective blades, said retaining means being engageable by the end portions of said blades to limit radial movement of the blades in the respective grooves; a fulcrum provided intermediate the end portions of each blade and located between the inner end face of the respective blade and the bottom face of the respective groove, said fulcra providing pivots about which the blades may tilt in planes passing through the axis of said drum; and adjusting means arranged to change the position of said pivots radially of said drum and to thereby adjust the extent of radial movement of the blades in the respective grooves.

19. A cutter comprising a rotary carrier member having a peripheral surface provided with an axially parallel radially inwardly extending groove having a bottom face which is inclined with reference to the axis of the carrier member; an elongated cutting member extending into said groove and having a straight cutting edge coplanar with the axis of said carrier member and located externally of said peripheral surface, said cutting member having an inner end face which is normally spaced from said bottom face and said cutting member comprising two end portions in said groove; a pair of retaining elements fixed to said carrier member and each located radially outwardly of one end portion of said cutting member; a fulcrum secured to said cutting member and having a rounded portion adjacent to said bottom face intermediate said end portions so that the cutting member is tiltable about said rounded portion in a plane passing through the axis of said carrier member and to the extent determined by said retaining elements; a wedge-shaped adjusting member received in said groove between said bottom face and said rounded portion so that said rounded portion may abut against said adjusting member in response to movement of said cutting member radially inwardly of said carrier member, said adjusting member being shiftable in the axial direction of said carrier member to change the radial clearance of the cutting member.

20. A cutter as set forth in claim 19, further comprising means for locking said adjusting member in position with reference to said carrier member.

21. A cutter comprising a rotary carrier member having a peripheral surface provided with an axially parallel radially inwardly extending groove having a bottom face; an elongated cutting member extending into said groove and having a straight cutting edge coplanar with the axis of said carrier member and located externally of said peripheral surface, said cutting member having an inner end face normally spaced from said bottom face and said cutting member comprising two end portions in said groove; a pair of retaining elements fixed to said carrier member and each located radially outwardly of one end portion of said cutting member; and a fulcrum having a stem threaded into said carrier member intermediate the end portions of said cutting member, said stem extending radially of said carrier member and outwardly from said bottom face and having a rounded head adjacent to said inner end face so that said cutting member is tiltable about said head in a plane passing through the axis of said carrier member.

22. A cutter as set forth in claim 21, further comprising means for rotating said stem so as to move said rounded head in the radial direction of said carrier member, and means for normally locking said stem against rotation with reference to said carrier member.

23. A cutter as set forth in claim 22, wherein the means for rotating said stem comprises a washer rigid with said stem and located between said faces, said washer having at least one opening which may receive a tool serving to rotate the washer and the stem whereby the head of the stem moves radially of the carrier member.

24. A cutter as set forth in claim 22, wherein said locking means comprises a pin received in an axially extending bore provided in said carrier member and means for biasing said pin against said stem.

25. A cutter comprising a rotary carrier member having a peripheral surface; a pair of retaining elements secured to axially spaced portions of said carrier member and each defining with said carrier member a channel adjacent to said peripheral surface; an elongated cutting member adjacent to said peripheral surface and having a straight cutting edge coplanar with the axis of said carrier member, said cutting member comprising two spaced portions each received with clearance in one of said channels so that the cutting member is movable radially of said carrier member while the cutting edge remains coplanar with the axis of said carrier member; and a fulcrum disposed between said channels and arranged to provide a pivot for said cutting member so that said cutting edge may be tilted into and out of parallelism with the axis of said carrier member, said fulcrum comprising a spherical head received in a socket provided in one of said members and having a section extending radially of said carrier member, a threaded element screwed into the other member and having a section coaxial with and movable in the axial direction of said first mentioned section, one of said sections being telescoped into the other section and said fulcrum further comprising means for limiting axial movements of said sections with reference to each other.

References Cited
UNITED STATES PATENTS

| | | | |
|---|---|---|---|
| 565,186 | 8/1890 | Taylor | 83—677 |
| 927,846 | 7/1909 | Flett | 83—678 |
| 968,121 | 8/1910 | Carlton | 83—582 |
| 1,006,783 | 10/1911 | Paquin | 83—344 |
| 1,746,048 | 2/1930 | Novick | 83—300 |
| 2,270,639 | 1/1942 | Parks | 83—677 |
| 2,660,242 | 11/1953 | Lane | 83—674 |
| 2,682,306 | 6/1954 | Schriber | 83—346 |

FOREIGN PATENTS 140,456  3/1953  Sweden.

ANDREW R. JUHASZ, *Primary Examiner.*